United States Patent [19]

Chen

[11] Patent Number: 4,603,996
[45] Date of Patent: Aug. 5, 1986

[54] STRUCTURE FOR TEE JOINT

[76] Inventor: Kuang P. Chen, No. 1, Lane 189, Sec. 6, Yen Ping N. Rd., Taipei, Taiwan

[21] Appl. No.: 736,611

[22] Filed: May 21, 1985

[51] Int. Cl.$^4$ ............................................. F16B 7/00
[52] U.S. Cl. ........................................ 403/7; 403/237
[58] Field of Search .................... 403/237, 234, 260, 7

[56] References Cited

U.S. PATENT DOCUMENTS

| | | | |
|---|---|---|---|
| 2,602,493 | 7/1952 | Burdick | 403/7 |
| 2,647,000 | 7/1953 | Colley | 403/237 |
| 3,713,677 | 1/1973 | Du Preez | 403/237 |
| 3,787,131 | 1/1974 | Reachek | 403/234 |
| 3,985,460 | 10/1976 | Piper et al. | 403/234 |
| 4,190,375 | 2/1980 | Berry | 403/260 X |

Primary Examiner—Andrew V. Kundrat
Attorney, Agent, or Firm—Armstrong, Nikaido, Marmelstein & Kubovcik

[57] ABSTRACT

This invention relates to an improved structure for tee joint comprising a first tube provided at one end with a saddle shaped recess. A second tube is furnished at its periphery with a pair of aligned holes and can be disposed on the recess of the first tube. A housing provided at its center with tapered recess is received in and secured to the interior of the first tube near the recess thereof. A tapered plug is received in and secured to the tapered recess of the housing. A threaded member is passed through the aligned holes of the second tube and engaged with the tapered plug received in the first tube to make the second tube fixedly secured to the first tube.

1 Claim, 5 Drawing Figures

STRUCTURE FOR TEE JOINT

BACKGROUND OF THE INVENTION

This invention relates to an improved structure for tee joint and is particularly suitable for the joining of the tubing or piping members.

Tubing and piping members can be used to constitute various useful structures such as furniture, frames and the like. Such tubing and piping members should be fixedly connected one to another by means of the suitable joints to form the desired and reliable structures.

However, commonly used joints usually are tee type joints of which the structures are complicated and unsatisfactory.

It is, therefore, an object of the present invention to obviate the above-mentioned drawback.

SUMMARY OF THE INVENTION

It is the primary object of the present invention to provide an improved structure for a tee joint which is easy to assemble.

It is another object of the present invention to provide an improved structure for a tee joint which is easy to operate.

It is still another object of the present invention to provide an improved structure for a tee joint which is economic to manufacture.

DETAILED DESCRIPTION OF THE PREFERRED EMBODIMENT

Figure 1:
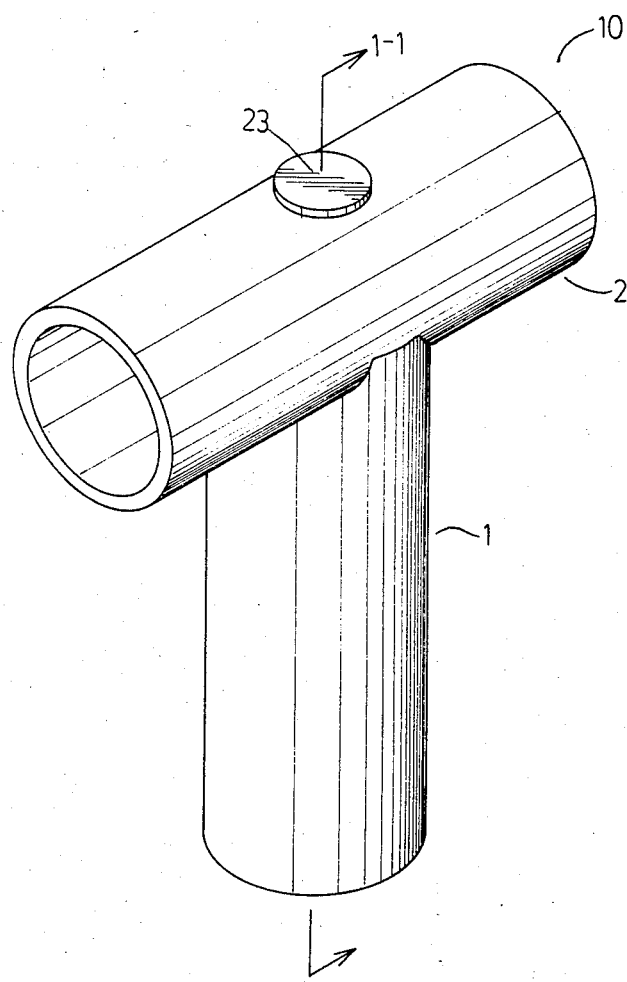
FIG. 1 is a perspective view of a preferred embodiment of the present invention.
Figure 2:
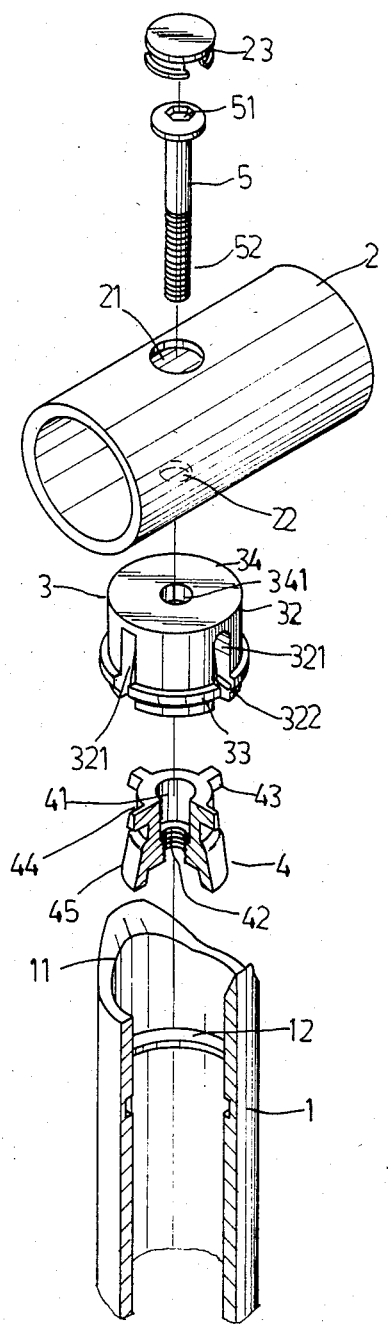
FIG. 2 is a perspective fragmental view of FIG. 1.

Referring to the drawings and particularly to FIGS. 1 and 2, an improved structure for a tee joint (10) mainly comprises a first hollow tube (1), a second hollow tube (2), a housing (3) and a tapered plug (4).

Figure 3:
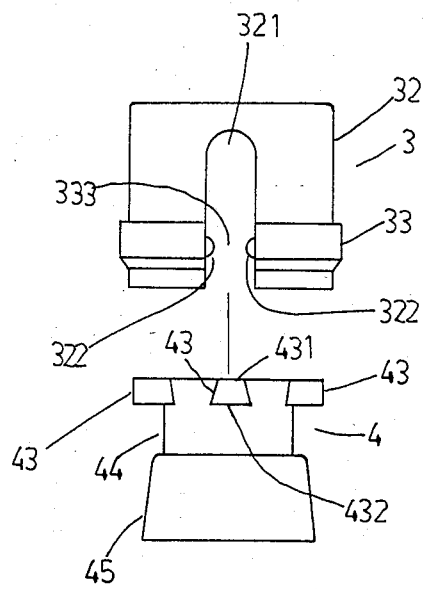
FIG. 3 is a side elevational view of the housing and tapered plug shown in FIG. 2.
Figure 4:
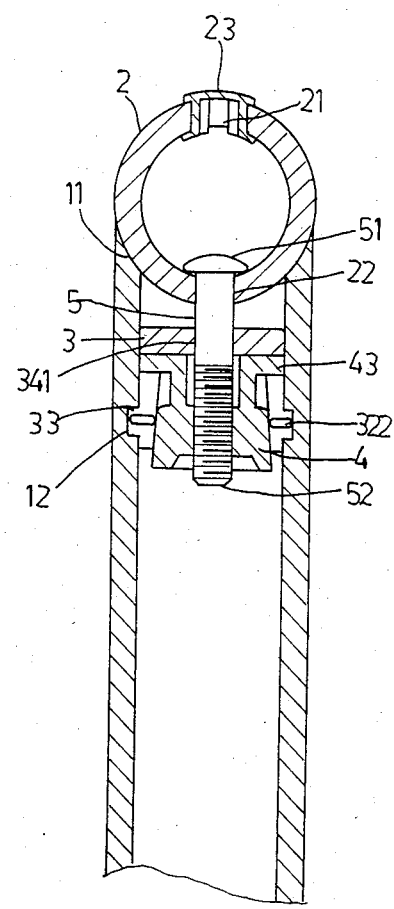
FIG. 4 is a cross-sectional view taken along line 1—1 of FIG. 1.

The first hollow tube (1) is provided at one end with a saddle shaped recess (11) and at the inner circumference with a annular groove (12) near said recess (11). The second hollow tube (2) is furnished at its periphery with a pair of aligned first and second holes (21) and (22) wherein the size of the former is somewhat larger than that of the latter. A screw (5) is provided with a enlarged end (51) together with a threaded shank (52) projecting therefrom wherein the size of the enlarged end (51) is smaller than that of the first hole (21) and is larger than that of the second hole (22). Referring to FIG. 4, the screw (5) can be inserted through the first hole (21) of the second hollow tube (2) and lean against the inner margin of the second hole (22) thereof. A cover (23) corresponding to the first hole (21) thereof can be properly placed thereon to provide a overall pleasing appearance. The housing (3) preferably made of elastic materials is provided at its center with a tapered recess (not shown), and the end wall (34) thereof is furnished at its center with an aperture (341) through which the threaded shank (52) of the screw (5) may pass. The housing (3) is provided at its outer circumference (32) with a annular flange (33) corresponding to the annular circumference (32) thereof is provided with four slots (321) which are axially extending and equally spaced from one another. Two aligned slots (321) are each provided on the inner opposite sides with a pair of opposite flanges (322) respectively adjacent to the annular flange (33) thereof. The outer radius of the housing (3) corresponds to the inner radius of the first tube (1). The tapered plug (4) is provided at the center with a central hole (41) corresponding to the aperture (341) of the housing (3) and the inner wall thereof is formed with threads (42) mating with the threaded shank (52) of the screw (5). Referring to FIGS. 2 and 3, the tapered plug (4) is furnished at its outer upper periphery with four trapezoidal-sectioned protuberances (43) respectively corresponding to the four slots (321) of the housing (3) wherein the width of the upper end (431) of each protuberance is narrower than the distance between the two opposite flanges (322) of the slots (321) while the lower end (432) thereof is wider than the distance therebetween.

Therefore, referring to FIG. 3, when the tapered plug (4) is to be inserted into the housing (3) with its protuberances (43) respectively corresponding to the slots (321) of the housing (3), the upper end (431) thereof will be easily inserted through the entrance (333) formed between the opposite flanges (322) while the lower end (432) thereof will be inserted through said entrance (333) by force. Since the width of the lower end (432) is wider than that of the entrance (333), this will prevent the tapered plug (4), after insertion into the housing (3), from sliding out thereof.

Furthermore, referring to FIG. 3, the shape of the tapered plug (4) is so designed that the outer radius of the upper portion (44) thereof is smaller than the inner radius of the tapered recess of the housing (3) while the outer radius of the lower portion (45) thereof is slightly larger than the inner radius of said tapered recess. When the upper and lower portions (44) and (45) of the tapered plug (4) are completely received within the housing (3), this will make the housing (3) slightly expanded outwardly. However, if only the upper portion (44) thereof is received within the housing (3), this will make the housing capable of being slightly pressed inwardly to make it easily inserted into the first hollow tube (1).

In assembling, referring to FIGS. 2 to 4, firstly, the tapered plug (4) is inserted into the housing (3) merely with its upper portion (44) received therein to achieve a sub-assembly.

This arrangement, as described above, can facilitate the next inserting step. Secondly, such sub-assembly slightly pressed inwardly is inserted through the recess (11) and into the interior of the first hollow tube (1) with its annular flange (33) received within the annular groove (12) thereof. Thirdly, as shown in FIG. 4, the second hollow tube (2) is disposed on the recess (11) with its aligned holes (21) (22) corresponding to the aperture (341) of the housing (3) and then the screw (5) is so arranged that the enlarged end (51) thereof is passed through the first hole (21) and then is engaged against the inner margin of the second hole (22) while the threaded shank (52) thereof is to be engaged with the threads (42) of the tapered plug (4). Fourthly, turning the screw (5) to make the tapered plug (4) fixedly engaged with the screw (5) and completely received within the housing (3) meanwhile to secure the second hollow tube (2) to the first hollow tube (1). It is noted that when the tapered plug (4) is completely received within the housing (3), the housing (3) will be slightly expanded to make its annular flange (33) fixedly engaged against the annular groove (12) of the first hollow tube (1) and hence rigidly secured thereto. Finally, the cover (23) is placed on the first hole (21) thereof to achieve an overall pleasing appearance.

Figure 5:
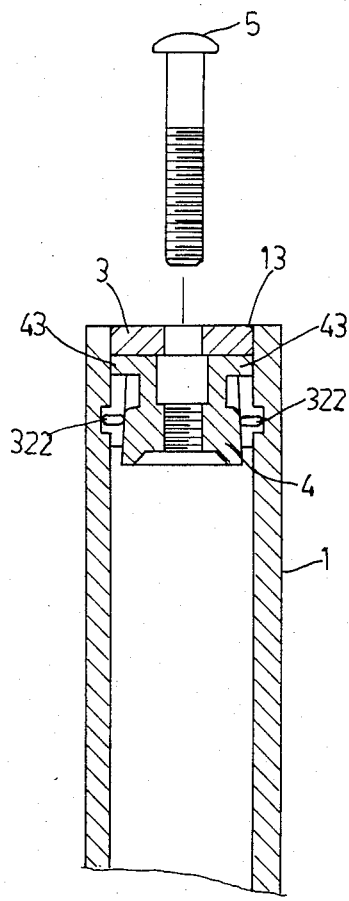
FIG. 5 is a cross-sectional view of an alternative embodiment of the present invention wherein a second tube is not illustrated therein.

FIG. 5 illustrates an alternative embodiment of the present invention, wherein the first tube (1) can be formed with a flat end portion (13) instead of a saddle shaped recess (11) as shown in FIG. 2 to provide an alternative use.

I claim:

1. A structure for a tee joint comprising:

a bolt;

a first tube member with one end shaped to form a saddle-shaped recess, and being internally provided with an annular groove near said recessed end;

a second tube member provided with a first hole and a second hole for passing said bolt, the connecting line of the centers of said two holes vertically passing the central axis of said second tube member, the first hole being greater in diameter than the second hole, said recessed end of said first tube being shaped to fit the contour of said second tube member;

a substantially cylindrical housing formed by resilient material, with one end opened and the other end closed, said closed end being centrally provided with an aperture for passing the front end of said bolt, said housing being peripherally provided with a substantially annular external flange formed as an integral part of said housing, the shape and size of said flange corresponding to said annular groove, said housing being further provided with four equidistantly spaced narrow slots axially extending a length from one opened end, the outer diameter of the unflanged major portion of said housing corresponding to the inner diameter of the ungrooved major portion of that interior of said first tube member, said first tube member and said housing being such that the latter can be deformably and resiliently pushed into the former in position so that the latter's flange fits into the former's groove;

a substantially frustal plug member having a smaller top end and a bigger bottom end, centrally provided with a bore which is at least partly internally threaded for engaging with said bolt, the top end of said plug member being provided with four equidistantly spaced protuberences corresponding to said slots and which can be axially guided in the latter, said protuberance extending radially a length corresponding to the thickness of the substantial portion of the top end of said plug, the top end of said plug having an outer diameter smaller than the inner diameter of said housing, while the bottom end of said plug having an outer diameter slightly greater than the inner diameter of the housing, the height of said plug being such that the whole plug can be received inside said housing;

the structure being characterized in that at least two opposite grooves are provided with retaining means cooperating with the corresponding protuberances to hold said plug and said housing together, said retaining means comprising check means provided at the entry end of the corresponding slots which make the entry portion of a slot slightly narrower than the remaining portion thereof, and that each of said protuberances has a trapezoidal section and axially tapers toward the top end of said plug member.

* * * * *